ROBERT A. KIRBY INVENTOR.

BY John D. Gassett

ATTORNEY

Nov. 29, 1966   R. A. KIRBY   3,288,244
SEISMIC SYSTEM

Filed Aug. 10, 1961   3 Sheets-Sheet 2

ROBERT A. KIRBY *INVENTOR.*

BY *John D. Gassett*
ATTORNEY

ROBERT A. KIRBY INVENTOR.

BY John D. Gassett
ATTORNEY

United States Patent Office 3,288,244
Patented Nov. 29, 1966

3,288,244
SEISMIC SYSTEM
Robert A. Kirby, Tulsa, Okla., assignor, by mesne assignments, to Esso Production Research Company, Houston, Tex., a corporation of Delaware
Filed Aug. 10, 1961, Ser. No. 130,536
7 Claims. (Cl. 181—.5)

The present invention is concerned with a method and apparatus for generating seismic pulses. The invention especially concerns a gas energized seismic impulse source which can be used without the drilling of seismic shot holes.

The use of seismic impulses for studying the earth's substrata is well known. In general, an artificial seismic disturbance is set up near the earth's surface. A portion of the seismic disturbance travels downwardly until it encounters a subsurface discontinuity such as an interface between two strata and a portion of the energy is reflected back toward the surface of the earth. Sensitive detection devices, sometimes known as geophones, are placed in the vicinity of the disturbance and detect the reflected energy. By measuring the time intervals between the initiation of the seismic impulses and the reception of the reflected energy at each of many detection stations it is possible to learn a great deal about the nature and structure of the earth's subsurface. The use of seismic prospecting procedures has found particular application in prospecting for petroleum.

In employing seismic methods in search for oil and gas a widely used practice consists in drilling a so-called shot hole into which a dynamite charge can be placed and later detonated. A normal shot hole may vary in depths from as shallow as about 50 feet to as deep as about 250 feet. After the shot hole has been drilled and the dynamite placed therein, and geophones planted about the area, the dynamite is then detonated. The resulting waves or reflections from subsurface events of the down-travelling energy from the seismic impulses are then detected by the geophones. While this system has proved quite useful in the exploration for oil and gas, it is also a rather expensive operation. One of the greater expenses in this system is the drilling of the shot holes. Various systems have been attempted to remove the necessity of drilling shot holes. One which is presently receiving wide attention is the so-called "thumper" system wherein a heavy weight is lifted above the earth's surface and is dropped, thus imparting a seismic shock into the earth. While this system has been shown to be of certain value, it also has certain drawbacks. For example, the thumper is primarily useful on level land and when moved to a sloping area such as a hillside, operational difficulties are encountered. Further, a considerable amount of heavy hoisting equipment is required to lift the weight so that it can be dropped.

It is an object of this invention to provide a system whereby seismic disturbance can be imparted into the earth without the drilling of shot holes, yet being useful on hillsides as well as level land and not requiring heavy hoisting equipment.

Briefly in a preferred embodiment, the invention uses a cylindrical-like housing which is divided into an upper chamber and a lower chamber by a partition or orifice plate. The partition has an orifice therein which establishes fluid communication between an upper chamber and a lower chamber. A piston is slidably fitted and mounted in the lower chamber and a shaft extends downwardly from the piston through the lower end of the housing in a slidable and sealing relationship. An impact plate is mounted to the lower end of the shaft exterior of the housing. When the piston is in its uppermost position, it contacts seals about the orifice of the orifice plate and when in this position, only a small part of the upper surface of the piston is in fluid communication with the fluid in the upper or high pressure chamber. Port means are provided in the wall of the housing of the upper chamber so that high pressure gas can be admitted to the high pressure chamber; the same port can be used for exhausting the air from the high pressure chamber or an additional exhaust port may be provided. Low pressure fluid port means are provided in the lower part of the low pressure chamber for admission of relatively low pressure gas.

To charge this device the upper or high pressure chamber is vented to the atmosphere and low pressure air is injected into the lower chamber beneath the piston which drives the piston to its uppermost position where it comes in sealing contact with the lower side of the partition. At this time high pressure fluid which is preferably air is injected into the upper or high pressure chamber above the partition. As the area of the piston in contact with the low pressure air is much greater than that in communication with the high pressure air in the upper chamber, the pressure in the upper chamber can be raised to a relatively high level without forcing the piston downwardly with respect to the housing. When in this condition, the instrument is charged and ready to be triggered. To trigger the device all that is necessary to do is to exhaust the low pressure air beneath the piston to the atmosphere.

Means are provided to rapidly lower the pressure of the gas in the low pressure chamber beneath the piston. When this occurs, the high pressure gas forces the piston downwardly and as soon as the seal of the piston with the lower side of the orifice plate is broken, the area of the piston in contact with the high pressure gas is increased many times. This causes the piston to move with a very rapid acceleration and strike the ground through its coupling through the impact mass with a very great force.

Further objects and a better understanding of the invention may be had from the following description taken in conjunction with the drawing in which.

Figure 1:
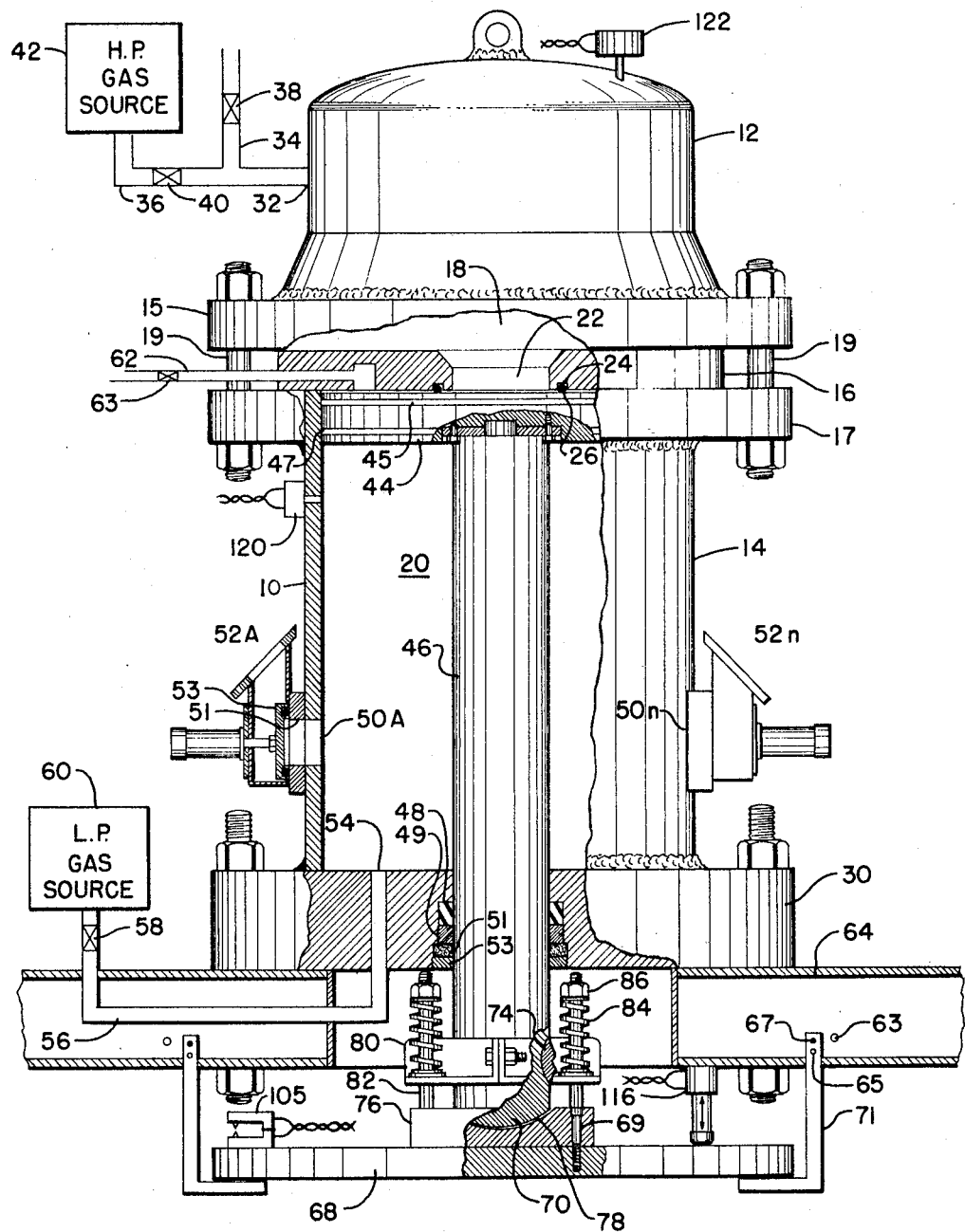
FIG. 1 illustrates, partially in section, a preferred embodiment of the invention.

Turning to the drawing and FIG. 1 in particular, there is illustrated the best mode contemplated for carrying out the invention. Illustrated thereon is an elongated housing which is preferably cylindrical and for convenience is made up of an upper section or dome 12 and a lower section 14. An orifice plate or partition 16 divides the interior of the housing means into an upper high pressure chamber 18 and a lower or low pressure chamber 20. Upper member 12, orifice plate 16, and lower section 14 can be joined together in any well known manner such as by welding, bolted connections, or the like. A preferred manner is to have an annular plate 15 welded to the lower periphery of dome section 12 and an annular plate 17 welded to the upper periphery of section 14. Orifice plate 16 sealingly fits between annular plates 15 and 17 which have a greater diameter than orifice plate 16. Annular plates 15 and 17 are connected by bolts 19.

Orifice plate 16 has an orifice 22 in the center thereof. The lower side of orifice plate 22 has a circular groove 24 around orifice 22 in which is placed a seal such as O-ring 26. Seals 26 are carried and supported by orifice plate 16. The lower end of lower section 14 is closed by end plate 30 which, as illustrated, is of a larger diameter than section 14.

In the wall of housing section member 12 is port 32. Only one port is illustrated, however, it is to be understood that any practical number of ports can be used. Port 32 has a conduit means connected thereto which has two branches 34 and 36. Branch 34 has valve 38 and branch 36 has valve 40. Conduit 34 is vented to the atmosphere and conduit 36 is connected to a high pressure gas source 42.

Slidably fitted and mounted in a sealing relationship in the lower housing section 14 is piston 44. Piston 44 has upper ring 45 and lower ring 47 to aid in giving this sealing relationship. Rigidly attached to piston 44 is shaft 46 extending downwardly through the lower end plate 30 in a slidable and sealing relationship. For this purpose seals 48 are carried by end plate 30 and are held in place by retaining nut 49. A wiper ring 51 is mounted about shaft 46 and held in position by retaining ring 53 threadedly connected to plate 30.

The lower side of piston 44 has an area $A_1$ exposed to the interior of low pressure chamber 20. When piston 44 is in its uppermost position, as shown in FIG. 1, it has an area $A_2$ exposed to the fluid in upper chamber 18. $A_2$, which is the area within the contact with seal 26, is seen to be considerably less than $A_1$. The entire upper area of piston 44 is represented by $A_3$ and is greater than $A_1$. The significance of these areas will become apparent in the description which follows hereinafter.

Mounted in the wall of lower section 14 are low pressure exhaust ports 50A to 50n which have valve means 52A to 52n therein with valve 53 operable to sit on seat 51. The particular valve shown is a double-acting air operated cylinder which operates to seat and unseat valve 53 on seat 51 and provides for rapid exhaust of chamber 20. As this double-acting cylinder is commercially available, its details will not be discussed. Ports 50 are preferably located such that they will be above piston 44 when piston 44 is in its lowermost position. Mounted in the lower end of lower chamber 20 and preferably in plate 30 is low pressure air inlet 54. In the conduit means 56 which leads to port 54 is valve 58. Conduit 56 is connected to a low pressure air source 60. A small weep conduit 62 is provided in orifice plate 16 to provide fluid communication between the exterior of the apparatus and the space confined between orifice plate 16 and seals 26 and piston 44 when in its uppermost position. This permits the pressure in that space to become equal to the atmospheric pressure. A valve 63 can be provided in conduit 62 but is normally open during operations of the device.

Figure 2:
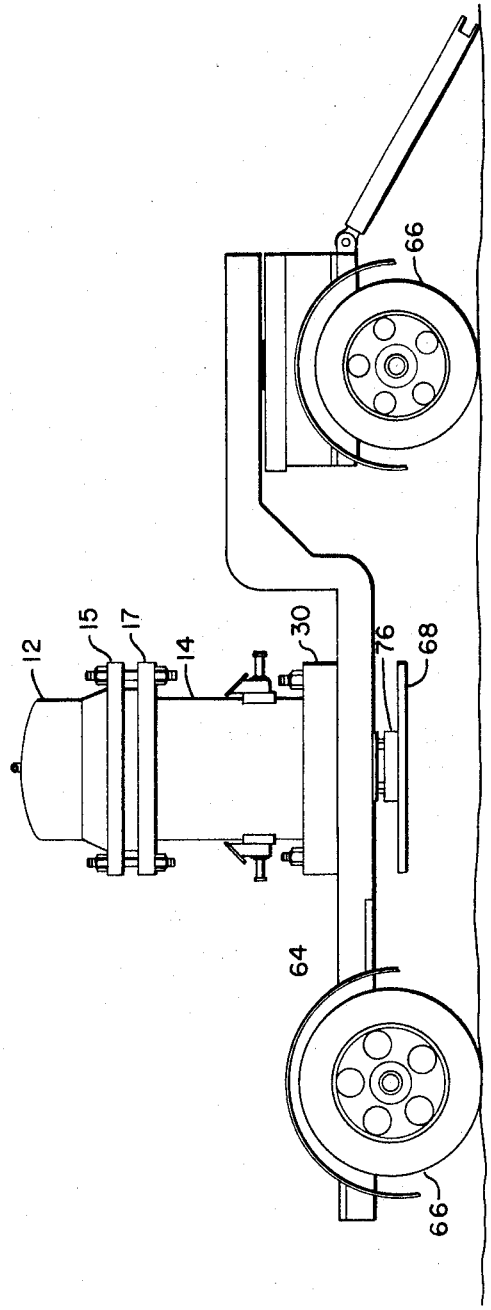
FIG. 2 illustrates the embodiment of FIG. 1 mounted for transportation.

The whole apparatus is supported from a frame 64 which is supported from wheels 66, as shown in FIG. 2. Mounted on the lower end of shaft 46 exterior of lower end plate 30 is impact mass 68. When piston 44 is in its uppermost position, plate 68 is carried a height above the ground which permits the impact plate to strike the earth before piston 44 clears ports 50A to 50n on its downward stroke.

The preferred manner of attaching impact mass 68 to shaft 46 is illustrated in FIG. 1. This arrangement permits the impact mass to pivot slightly on shaft 46 to accommodate irregularities in the ground such as a rock or the like. Shown in FIG. 1 is the lower end of shaft 46 which is rounded at 70 at its lower end. Close to its lower end is a groove 74. A pivot plate 76 is rigidly attached to impact mass 68 by bolts 69 for example. Pivot plate 76 has a recessed portion or pivot 78 which receives the rounded section 70 of shaft 46 in a pivotally fitted relationship. Mounted in groove 74 is retaining collar 80. Collar 80 is thus rigidly clamped to shaft 46. It is preferred that plate 76 is permitted to vary or pivot about the lower end of shaft 46 about 15° up or down from the normal to the axis of shaft 46. Extending upwardly from plate 76 are bolt means 82 which are securely fastened to plate 76. Bolts 82 extend upwardly through plate 80. A spring 84 is mounted about bolt 82 above plate 80 and is held in position there by nut 86. Impact mass 68 then is seen to be supported from shaft 46 through pivot plate 76, bolts 82, spring 84 and retaining collar 80. The rapid acceleration of piston 70, as will be seen, is transmitted through shaft 46 to pivot plate 76 and to impact plate 68.

Having described the embodiment of FIG. 1, attention will now be directed briefly toward its operation. The device is moved to the point at which it is desired to impart a seismic shock into the earth. Valve 38 is open to vent high pressure chamber 18 to the atmosphere and low pressure exhaust ports 50 are closed by closing valves 52A to 52n, thus closing low pressure chamber 20. Relatively low pressure air is then admitted through port means 54 by opening valve 58. The pressure of the low pressure air is designated $P_1$ and forces piston 44 upwardly to its uppermost position as shown in FIG. 1. When piston 44 moves upwardly, air is forced out through exhaust port means 34 from upper chamber 18. When piston 44 has reached its uppermost position, only area $A_2$ is in contact with the pressure $P_2$ in high pressure chamber 18. At this time exhaust valve 38 for the upper high pressure chamber 18 is closed. Valve 40 is then opened and relatively high pressure air is injected through port means 32 into high pressure cylinder 18. When piston 44 is in the position shown in FIG. 1, the upward force on piston 44 is equal to Formula 1.

(1) $\qquad$ Upward force $= P_1 A_1$

The downward force acting on piston 44 when in the position shown in FIG. 1 is equal to (2) $\qquad$ $P_2 A_2$ plus M where M is the weight of piston 44, shaft 46, impact mass 68 and its associated parts. In order for piston 44 to remain in the position shown in FIG. 1, Equation 1 must be greater than Equation 2. That is, the total force represented by Equation 1 must be greater than in Equation 2. At this point the apparatus is ready to be triggered. At this time the air supply to both chambers 18 and 20 are cut off by closing valves 40 and 58. It is triggered by rapidly opening the low pressure chamber 20 to the atmosphere by opening valves 52A to 52n. The size of valves 52A to 52n should be such that the pressure in chamber 20 is rapidly reduced to atmospheric pressure. With the rapid reduction of pressure in chamber 20 the downward force on piston 44 is greater than the upward force and the piston is pushed downwardly. As soon as the seal of the top surface of piston 44 with seal 26 is broken, the high pressure gas in chamber 18 is in contact with the total area $A_3$ of the top side of piston 44. The force then on piston 44 is $P_2 A_3$ which causes tremendous acceleration downwardly of piston 44 and causes impact mass 68 to strike the surface of the earth with tremendous force.

It will be realized, of course, that the apparatus may be constructed in a variety of sizes and may be adapted to provide a wide range of thrust magnitudes. A device similar to that illustrated in FIG. 1 has been constructed in which piston 44 is 22 inches in diameter and has a stroke of about 20 inches. Chamber 18 has a volume of about 3.17 cubic feet and $A_2$ is about 35 square inches. Various low pressure air and high pressure air supply systems can be used with this apparatus. However, for a low pressure air pressure of about 70 p.s.i.g., $P_2$ can safely be about 500 p.s.i.g. without danger of pre-triggering another system by a slight reduction of $P_1$ when $A_1 = 354$ sq. in., $A_2 = 35$ sq. in., $A_3 = 380$ sq. in. and $M = 1921$ pounds. Under these conditions the apparatus is designed to hit the ground with kinetic energy in excess of 150,000 ft. pounds.

When piston 44 is rapidly accelerated downwardly, there is a tendency for housing 10 to be raised. To resist any urge to be moved upwardly an additional mass can be added, if necessary, either to the top of housing 10 or on frame 64 or otherwise anchoring the device against upward movement. When piston 44 moves downwardly below ports 50, air is trapped in chamber 20 below the piston, if valve 58 is closed. Further relative downward movement of piston 44 compresses the trapped air and tends to resist upward movement of the housing.

When the apparatus is being moved, the impact mass 68 is raised off the ground as by the use of air pressure in the chamber 20 beneath the piston 44. In order not to be dependent upon air pressure to hold the piston in its uppermost position, a clamp 71 supported from pivot 67 on frame 64 is provided to hold impact mass 68 in its raised position. Locking means 65 which can be a bolt is provided to hold clamp 71 in the position shown by placing bolt 65 through mating holes in clamp 71 and frame 64. A second mating hole 63 is provided in frame 64 to support clamp 71 in a position to clear impact plate 68.

Figure 3:
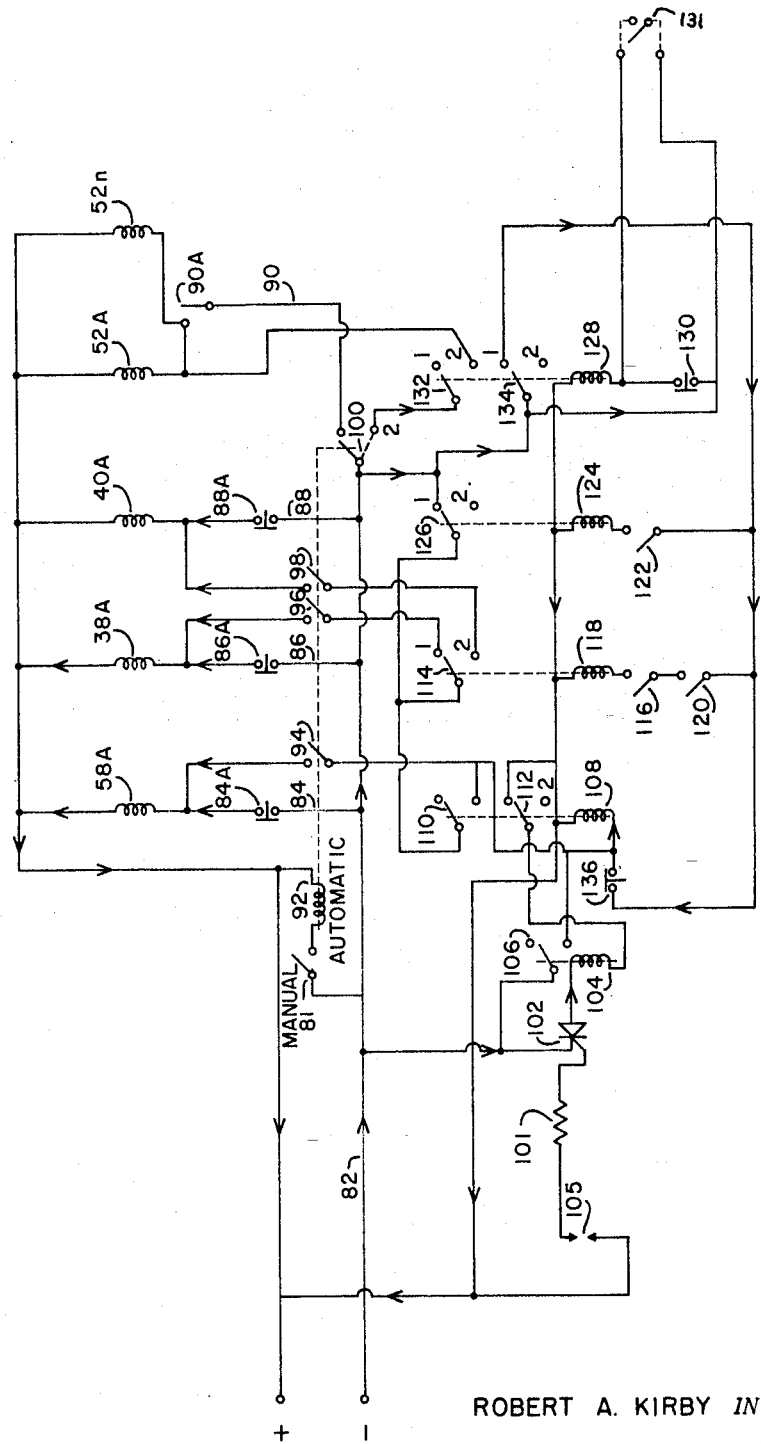
FIG. 3 illustrates a control circuit for the device of FIG. 1.

A control system is illustrated in FIG. 3 for use with the apparatus described above in FIG. 1. For the purpose of describing the control circuit of FIG. 3 it will be assumed that valve 58 for the low pressure air inlet, valve 38 in the exhaust for the high pressure chamber, high pressure inlet valve 40, and valves 52A to 52n of the low pressure exhaust, are solenoid operated valves which are normally closed when not energized. Illustrated on FIG. 3 are solenoid coils 58A, 38A, 40A and 52A to 52n which represent the solenoids of valves 58, 38, 40, and 52A to 52n respectively. The circuit in FIG. 3 contains provisions for manual operations and for automatic operations. First the part of the circuit which provides for manual operations will be considered. A two-position manually operated switch 81 is provided in power supply line 82.

Power line 82 has four branches 84, 86, 88 and 90 which lead to solenoid coils 58A, 38A, 40A and 52A–52n respectively. Normally open manual switches 84A, 86A, 88A and 90A are in power branches 84, 86, 88 and 90 respectively. When manual switch 81 is open, the various solenoid valves can be opened or closed by operating manual switches 84A, 86A, 88A and 90A.

Attention will now be directed to that part of the circuit of FIG. 3 which is used for automatically operating the valves for charging and discharging the apparatus. A switch 81 in a branch of the power line from power line 82 has two positions, a manual position for operation of the system with the manually operated switches described above, or in its second position or closed position for operation of the automatic portion of the circuit to be described now.

When switch 81 is in its automatic position, relay 92 closes switches 94, 96 and 98 and places switch 100 in its number 2 position. As indicated switches 94, 96, 98 and 100 are ganged. The switches are shown in their relaxed or non-energized position. When relay 92 is energized, this connects all the valves to the automatic control part of the system. A branch of power line 82 is connected to the control rectifier 102 which is fired by momentarily closing switch 105 which changes the bias on control rectifier 102. A current control resistor 101 is provided to limit the gate current to rectifier 102. Control rectifier 102 is connected to reset relay 104 which is used to start the reset operation after a cycle is completed. Reset relay 104 closes normally open switch 106 which connects power to low load pressure relay 108 which, when energized, operates solenoid valve 58A through closing switch 110. Relay 108, when energized, moves switch 112 to its number 2 position which opens the circuit to relay 104 and control rectifier 102, thus extinguishing control rectifier 102 so it is then ready for its next series of operation. Simultaneously with the energizing of solenoid valve 58A, solenoid valve 38A is opened through two-position switch 114.

A piston position switch 116 is operated by position switch 116 which is suspended from frame 64 and operated mechanically upon the lifting of impact mass 68 to its upper position. Then when piston 44 is in its upper position, switch 116 is closed. Switch 116 is also illustrated in FIG. 1 with leads extending therefrom. Switch 116 is in the power line leading to high pressure relay 118. Also in the line leading to relay 118 is a second switch 120 which is normally opened, and closes when the pressure in the lower chamber 20 reaches a predetermined amount. When piston 44 is in its uppermost position, switch 116 is closed; and when the pressure in the lower chamber reaches a predetermined level, switch 120 is closed. When switches 116 and 120 are both closed, relay 118 is energized, thus moving switch 114 from position 1 to position 2. This causes solenoid valve 38A to close as it is de-energized and it opens valve 40A as that valve is then energized. This permits high pressure air to enter the high pressure chamber or upper chamber 18 while the low pressure air in chamber 20 is sealed therein.

A high pressure adjustable switch 122 is provided in upper chamber 18 and is also illustrated in FIG. 1. When this switch reaches a predetermined pressure, switch 122 (which is normally opened) closes, thus energizing ready relay 124. Ready relay 124 is connected to two-position switch 126. When switch 126 moves to its number 2 position, this de-energizes solenoid valves 58A and 40A, and in this position all valves are closed. The system is now fully charged and ready to fire.

When it is desired to trigger or fire the charged-up apparatus, fire relay 128 must be energized. This can be done locally by a manually operated switch 130 or suitable remote energizing means 131 such as radio operated, land line, or the like. When the system is on its automatic positioning, that is when switch 80 is closed, switch 100 is in its number 2 position and power is transmitted through switch 100 and two-position switch 132 to solenoid valves 52A which are the valves which close the port means from the low pressure chamber 20 to the atmosphere. When relay 128 is energized, switch 132 is transferred from position 1 to position 2 which energizes exhaust port valve 52A–52n, thus allowing the low pressure air in the low pressure chamber 20 to escape to the atmosphere. While relay 128 is energized it moves switch 134 to its number 2 position, which prevents the energization of relays 108, 118 and 124 which prevents valves 58A, 38A and 40A from opening until the relay 138 is released. Also included in the circuit is a manual start switch 136 which is merely a two-position switch and is used to initiate the original cycle.

To start the loading operations manual switch 136 is closed either by hand or from a remotely operated position. The closing of switch 136 energizes relay 108 which is then held closed through a set of its own contacts. It is not necessary to hold manually operated switch 136 closed once relay 108 has been energized. The closing of relay 108 causes solenoid valves 58A and 38A to open. Air from the low pressure regulated air source 60 is then injected through solenoid valve 58A into chamber 20 below piston 44. This causes the piston to rise. The air above piston 44 is forced into the atmosphere through ports 32 and valve 38 which is now open. When the piston reaches the proper position to seal off orifice 22, switch 116 is closed. The air pressure inside chamber 20 continues to build up to a pre-set pressure. At this pressure low pressure switch 120 closes. When piston position switch 116 and low pressure switch 120 are both closed, relay 118 is energized. The operation of the "load high pressure" relay 118 causes the high pressure exhaust solenoid valve 38A to close and the "high pressure inlet" solenoid valve 40A to open. This charges high pressure chamber with high pressure gas from source 42 to a predetermined pressure at which time high pressure switch 122 is closed. The closing of high pressure switch 122 energizes ready relay 124. Ready relay 124 causes the low pressure inlet solenoid valve 58A and the high pressure inlet solenoid valve 40 to remain closed. The system is now loaded and ready to "fire." Then it can be fired either from a local position manually or from a remote position by radio or land line.

The unit is fired by completing the circuit to fire relay 128 through switch 130 or a remote switch connected and parallel, such as switch 131. Operation of ready relay 124 energizes solenoid valves 52A–52n and operates to open the low pressure exhaust ports. When impact mass 68 strikes the ground, impact switch 105 (also illustrated in FIG. 1) closes momentarily and triggers the control rectifier 102. The control rectifier 102 energizes relay 104 and the sequence of events is repeated. The operation of relay 108 extinguishes the controlled rectifier 102 and allows the gate to regain control in preparation for the next cycle.

While there are above disclosed but a preferred embodiment of the structure of the invention herein presented, it is possible to produce still other embodiments without departing from the inventive concept herein disclosed. It is therefore desired that only such limitations be imposed on the appended claims as are stated therein.

What is claimed is:

1. An apparatus for generating a seismic signal which comprises in combination: a housing member closed at the upper and lower end; an orifice plate having an orifice therein which divides the housing into an upper chamber and a lower chamber which are in fluid communication with each other through said orifice; first port means in the wall of said housing above said orifice plate to provide for the flow of gas into and out of said chamber; a piston fitted within said lower chamber and vertically movable therein; a shaft rigidly connected to said piston and extending through the lower end of said housing in a slidable and sealing relationship therewith; exhaust port means in the wall of said housing below said piston when said piston is in its uppermost position; fluid inlet port means in the wall of said housing located below said exhaust port means; an impact mass mounted to the lower end of said shaft external of said housing and means to effect a fluid-tight seal between said piston and said orifice plate around said orifice when said piston is in its uppermost position within said lower chamber.

2. An apparatus for generating a seismic signal which comprises: a vertically arranged cylindrical housing closed at each end; an orifice plate dividing said housing into an upper chamber and a lower chamber and providing fluid communication between said chambers through an orifice in said orifice plate; a piston fitted within said lower chamber and adapted to be moved vertically back and forth therein; a rigid shaft connected to said piston and extending through the lower end of said housing in a slidable and sealing relationship therewith; port means in the wall of said housing above said orifice plate; second port means in the wall of said housing below said piston when said piston is in its uppermost position; and an impact mass mounted to the lower end of said shaft external of said housing.

3. An apparatus for generating a seismic signal which comprises: an elongated vertically disposed cylindrical housing closed at both its upper end and its lower end; an orifice plate dividing said housing into an upper chamber and a lower chamber with communication between said chambers through an orifice in said orifice plate; a piston fitted for vertical movement within the lower chamber; a shaft rigidly connected to said piston and extending through the lower end of said housing in a slidable and sealing relationship therewith, said shaft being characterized in that its lower end is shaped as a convex curved surface and also having a recess near its lower end; port means through the wall of said housing above said orifice plate; second port means through the wall of said housing below said piston when said piston is in its uppermost position against said orifice plate; an impact mass, said impact mass having a curved concave surface to fittingly receive the lower end of said shaft; a plate member mounted around said shaft in said recess; and resilient means connecting said impact mass to said plate member, thus holding said impact mass firmly against said shaft said piston and said orifice plate adapted to engage one another in a fluid-tight sealed relationship around said orifice when said piston is in its uppermost position within said lower chamber.

4. An apparatus for generating a seismic signal which comprises: an elongated, vertically disposed, hollow cylindrical member; an orifice plate having an orifice and closing the upper end of said cylindrical member; a plate member closing the lower end of said cylindrical member; a piston fitted and adapted to move vertically within the cylindrical member; a shaft rigidly connected to said piston and extending through said plate member in a slidable and sealing relationship therewith; a high pressure chamber having an opening, the periphery of said opening rigidly attached in a fluid tight relationship with the said orifice plate such that said high pressure chamber is in fluid communication with the interior of said cylindrical member through the orifice of said orifice plate; closable vent means for venting the high pressure chamber to the atmosphere; closable injection means for injecting high pressure gas to the high pressure chamber; second closable vent means for venting the interior of said cylindrical member to the atmosphere; inlet conduit means for use in injecting low pressure fluid into said cylindrical member below said piston; and an impact mass supported from the lower end of said shaft below said plate member.

5. An apparatus for generating a seismic signal for use with a high pressure gas source and a low pressure gas source which comprises: a housing member closed at the upper and lower end; an orifice plate having an orifice therein which divides the housing into an upper high pressure chamber and a lower low pressure chamber which are in fluid communication with each other through said orifice; a high pressure inlet port means in the wall of said housing above said orifice plate; a first solenoid valve means operable to close said high pressure inlet port means; exhaust port means in the wall of said housing above said orifice plate; second solenoid valve means operable to close said exhaust port means; a piston fittedly mounted within said lower chamber; a shaft rigidly connected to said piston and extending through the lower end of said housing in a slidable and sealing relationship therewith; a low pressure exhaust port means in the wall of said housing below said piston when said piston is in its uppermost position; third solenoid valve means operable to close said low pressure exhaust port means; a low pressure fluid inlet port means in the wall of said housing located below said low pressure exhaust port means; a fourth solenoid valve operable to close said low pressure inlet port means; an impact mass mounted to the lower end of said shaft external of said housing; an impact switch means mounted on said impact mass and operable to close upon said impact mass striking the earth; conduit means from said high pressure inlet port means to said high pressure gas source; second conduit means fluidly connecting said low pressure gas source to said low pressure fluid inlet port means; actuating means to simultaneously open said second valve means and said fourth valve means and close said third valve means; means to open said first valve means and close said second valve means upon said piston reaching a predetermined position and the pressure in the low pressure chamber reaching a predetermined value; and firing means operable to open said third valve means after the pressure in the upper high pressure chamber has reached a predetermined level and while maintaining said second and said fourth valve means in a closed position.

6. An apparatus for generating a seismic signal which comprises: a housing member; an orifice plate dividing said housing into an upper, closed chamber and a lower chamber, said orifice plate having an orifice therein; a piston fitted in the lower chamber and adapted to have vertically reciprocal movement therein; a shaft rigidly connected to said piston and extending through the lower end of said housing in a fluid-tight, slidable relationship; an impact mass carried on the lower end of said shaft; means to releasably hold said piston in fluid-tight engagement with said orifice plate; and means to provide said upper chamber with a gas under pressure greatly in excess of atmospheric pressure.

7. An apparatus for generating a seismic disturbance which comprises a vertically disposed enclosed housing, the upper end of said housing having an orifice to provide fluid communication through said upper end, a piston fitted within and adapted to move up and down within said housing, a piston rod connected at its upper end to said piston and extending downward in a slidable, fluid-tight relationship through the lower end of said housing, the inner surface of said upper end of said housing and the upper end of said piston adapted upon engagement with one another to form a releasable fluid-tight seal about said orifice, a source of high pressure gas adapted to communicate with the interior of said housing through said orifice, and port means penetrating said housing in a position to enable fluid communication between the exterior of said housing and the interior thereof below said piston.

References Cited by the Examiner

UNITED STATES PATENTS

| | | |
|---|---|---|
| 1,191,948 | 7/1916 | Coates. |
| 2,203,140 | 6/1940 | Green _____ 181—.5 |
| 2,234,831 | 3/1941 | Porter _____ 306—7 |
| 2,424,108 | 7/1947 | Merten. |
| 2,772,746 | 12/1956 | Merten _____ 181—.5 X |
| 2,933,068 | 4/1960 | Johnson et al. |
| 3,041,970 | 7/1962 | Foster _____ 102—25 |
| 3,044,452 | 7/1962 | McCrory et al. _____ 123—46 |
| 3,106,982 | 10/1963 | Wade _____ 181—.53 |

FOREIGN PATENTS 608,169   11/1960   Canada.

SAMUEL FEINBERG, *Primary Examiner.*

ALDRICH F. MEDBERY, CHESTER L. JUSTUS, BENJAMIN A. BORCHELT, *Examiners.*

A. S. ALPERT, J. W. MILLS, G. H. GLANZMAN, *Assistant Examiners.*